(12) United States Patent
Tojo et al.

(10) Patent No.: US 6,766,660 B2
(45) Date of Patent: Jul. 27, 2004

(54) MOLDING DIE AND MANUFACTURING METHOD OF MOLDED PRODUCT

(75) Inventors: Masaaki Tojo, Kitakasuragi-Gun (JP); Kazuo Morioka, Katano (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 367 days.

(21) Appl. No.: 09/898,446

(22) Filed: Jul. 5, 2001

(65) Prior Publication Data

US 2002/0011690 A1 Jan. 31, 2002

(30) Foreign Application Priority Data

Jul. 5, 2000 (JP) ......................................... 2000-203385

(51) Int. Cl.[7] .............................................. C03B 21/00
(52) U.S. Cl. ............................. 65/102; 65/286; 425/410
(58) Field of Search ................... 65/102, 286; 425/410, 425/406, 415, 352, 177; 249/157, 117; 264/219, 2.5, 325

(56) References Cited

FOREIGN PATENT DOCUMENTS

| JP | 2000-095532 | * | 4/2000 |
| JP | 2000-264653 | * | 9/2000 |
| JP | 2001-48553 | * | 2/2001 |

\* cited by examiner

*Primary Examiner*—Dionne A. Walls
(74) *Attorney, Agent, or Firm*—McDermott, Will & Emery

(57) ABSTRACT

A molding die has a shell having a penetration hole, a lower pattern installed in the lower opening of the shell, and an upper pattern slidably disposed from the upper opening of the shell. The shell includes an outer shell and an inner shell disposed inside of the outer shell. The inner shell is includes plural split shells. The inner shell can be separated from the outer shell. The inner shell, lower pattern, and upper pattern form a cavity. As a result, if the molded product sticks to the inner circumference of the shell, the molded product can be easily taken out of the molding die by disassembling the shell. Further, a molded product having an excellent dimensional precision can be manufactured.

15 Claims, 4 Drawing Sheets

Fig. 5

(a) A step of combining an inner shell in an outer shell having a second penetration hole, and obtaining a shell having a penetration hole, the inner shell having plural split shells

↓

(b) A step of disposing the lower opening of the penetration hole of the shell to a lower pattern in

↓

(c) A step of placing a molding material in a cavity surrounded by the penetration hole and lower pattern

↓

(d) A step of forming a molded product by inserting an upper pattern into the cavity from an upper opening of the penetration hole of the shell, and pressurizing the molding material while heating the molding material

↓

(e) After the molded product formed by pressurizing is solidified, separating the upper pattern and outer shell from the inner shell

↓

(f) A step of taking out the molded product by separating the plural split shells after step (e)

MOLDING DIE AND MANUFACTURING METHOD OF MOLDED PRODUCT

TECHNICAL FIELD OF THE INVENTION

The present invention relates to a molding die and a manufacturing method of a molded product, and more particularly to a molding die for pressure molding and a manufacturing method of a molded product.

BACKGROUND OF THE INVENTION

Generally, as a molding die for heating, pressurizing and molding a glass vitreous material, a molding die as shown in FIG. 6 is used. A conventional molding die comprises a tubular shell 21, a lower pattern 22, and an upper pattern 23. The lower pattern 22 is inserted and fixed at the lower end side of the shell 21. The upper pattern 23 is inserted from the upper end side of the shell 21, and is slidably inserted. A glass vitreous material 25 is disposed in this molding die 24, and is heated, pressurized and molded.

Hitherto, in such molding die 24, the tubular shell 21 was a columnar element made of a cemented carbide having a penetration hole. That is, the conventional shell 1 was an integrated one-body structure.

However, by using such conventional molding die 24, when a glass vitreous material 25 is heated, pressurized and molded, the glass vitreous material 25 spreads widely in the molding space in the molding die 24 in the molding process, or the glass vitreous material 25 sticks to the inner side of the shell 21. As a result, it was difficult to take out the glass molded product from the shell 21.

It is hence an object of the invention to present a molding die capable of taking out the molded product easily. Further, by using the molding die of the invention, a molded product having an excellent dimensional precision can be manufactured.

SUMMARY OF THE INVENTION

A molding die of the invention comprises:
(a) a shell having a penetration hole, the penetration hole having a lower opening and an upper opening,
(b) a lower pattern disposed to the lower opening of the shell, and
(c) an upper pattern slidably disposed from the upper opening of the shell,
in which the shell includes an outer shell and an inner shell disposed inside of the outer shell, the inner shell is composed of plural split shells, the inner shell can be separated from the outer shell, and the inner shell, lower pattern, and upper pattern form a cavity.

A manufacturing method of molded product of the invention comprises the steps of:
(a) combining an inner shell in an outer shell having a second penetration hole, and obtaining a shell having a penetration hole,
wherein the inner shell has plural split shells, and the penetration hole is surrounded by the plural split shells,
(b) disposing the lower opening of the penetration hole of the shell to a lower pattern,
(c) placing a molding material in a cavity surrounded by the penetration hole and lower pattern,
(d) forming a molded product by inserting an upper pattern into the cavity from an upper opening of the penetration hole of the shell, and pressurizing the molding material while heating the molding material,
(e) separating the upper pattern and outer shell from the inner shell and lower pattern after the molded product formed by pressurizing is solidified, and
(f) taking out the molded product by separating the plural split shells, after step (e).

In this constitution, if the molded product sticks to the inner circumference of the shell, the molded product can be easily taken out of the molding die by separating the shell. Further, a molded product having a complicated convex and concave shape can be manufactured easily.

BRIEF DESCRIPTION OF THE DRAWINGS

FIG. 5 shows a manufacturing process of molded product in an embodiment of the invention.

REFERENCE NUMERALS

Figure 1:
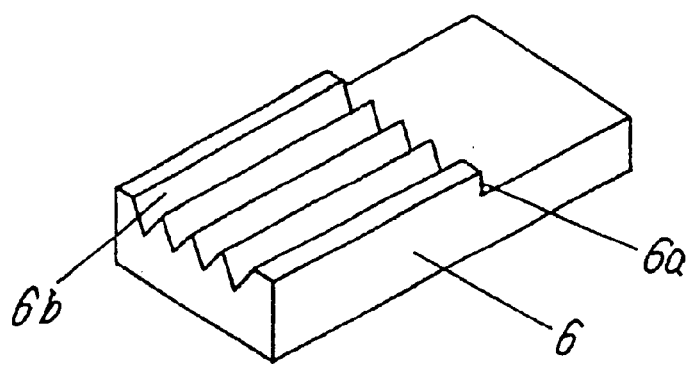
FIG. 1 is a perspective view of an optical fiber aligning array formed by using a molding die in an embodiment of the invention.

1 Shell
2 Lower pattern
3 Upper pattern
4 Molding die
7a First split shell (inner shell)
7b Second split shell (inner shell)
8 Guide pattern (outer shell)
9 Spacer

DESCRIPTION OF THE PREFERRED EMBODIMENTS

A molding die in an embodiment of the invention comprises:
(a) a shell having a penetration hole, the penetration hole having a lower opening and an upper opening,
(b) a lower pattern inserted and disposed in the lower opening of the shell, and
(c) an upper pattern slidably disposed from the upper opening of the shell,
in which the shell includes an outer shell and an inner shell disposed inside of the outer shell, the inner shell is composed of plural split shells, the inner shell can be separated from the outer shell, and the inner shell, lower pattern, and upper pattern form a cavity.

A manufacturing method of molded product in an embodiment of the invention comprises the steps of:
(a) combining an inner shell in an outer shell having a second penetration hole, and obtaining a shell having a penetration hole, in which the inner shell has plural split shells, and the penetration hole is surrounded by the plural split shells,
(b) disposing the lower opening of the penetration hole of the shell to a lower pattern (c) placing a molding material in a cavity surrounded by the penetration hole and lower pattern, (d) forming a molded product by inserting an upper pattern into the cavity from an upper opening of the penetration hole of the shell, and pressurizing the molding material while heating the molding material, (e) separating the upper pattern and outer shell from the inner shell and lower pattern after the molded product formed by pressurizing is solidified, and (f) taking out the molded product by separating the plural split shells after step (e).

Preferably, the outer shell has a second penetration hole, the inner shell is disposed in the second penetration hole, and the inner shell is composed of two split shells, that is, first split shell and second split shell.

Preferably, the inner shell is disposed detachably from the second penetration hole of the outer shell.

Preferably, the outer shell is formed of one die material not having junction.

Preferably, the shell has a spacer disposed between the outer shell and inner shell.

Preferably, the spacer has a larger coefficient of thermal expansion than the outer shell and inner shell.

Preferably, the inner shell has a same coefficient of thermal expansion as the outer shell.

Preferably, the cavity is filled with at least one material selected from the group consisting of glass, ceramics, and inorganic materials.

Preferably, the cavity has a shape for obtaining an optical fiber aligning array, and the optical fiber aligning array has plural V-grooves formed on the upper surface of a rectangular glass molded body.

In this constitution, if the molded product sticks to the inner circumference of the shell, the molded product can be easily taken out of the molding die by separating the shell. Further, a molded product having a complicated convex and concave shape can be manufactured easily.

In particular, since the spacer is interposed between the outer side of the split shell and the inner side of the outer shell, the shell combining the split shell and outer shell can be integrated firmly.

Further, the coefficient of thermal expansion of the inner shell is nearly same as the coefficient of thermal expansion of the outer shell, and the coefficient of thermal expansion of the spacer is larger than the coefficient of thermal expansion of the inner shell and outer shell, the integrating strength of the inner shell and outer shell when heating and forming is reinforced owing to the difference in the coefficient of thermal expansion. Moreover, the integrating strength of the shell after cooling of the die can be weakened. As a result, the molded product can be taken out easily.

Exemplary Embodiment 1

A molding die in an exemplary embodiment of the invention is explained below by referring to the accompanying drawings.

A molding die for manufacturing an optical fiber aligning array as an example of molded product is explained.

FIG. 1 is a perspective view of an optical fiber aligning array as an example of molded product. This optical fiber aligning array is used for aligning plural optical fibers for connecting with an optical waveguide, and is manufactured from glass material.

This optical fiber aligning array has a step part 6a formed on the top of a rectangular glass molded body 6, and plural V-grooves 6b. In this exemplary embodiment, an embodiment for forming V-groove array having V-grooves is explained as the optical fiber aligning array.

Figure 2:
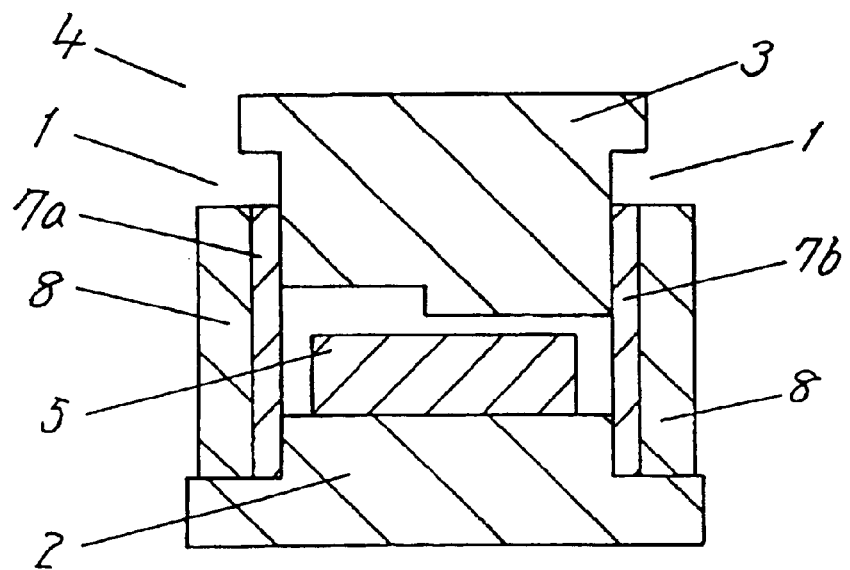
FIG. 2 is a sectional view of a molding die for forming an optical fiber aligning array in an embodiment of the invention.

When such optical fiber aligning array is formed, a molding die 4 as shown in FIG. 2 is used. In FIG. 2, the molding die 4 comprises a shell 1, a lower pattern 2, and an upper pattern 3.

Figure 3:
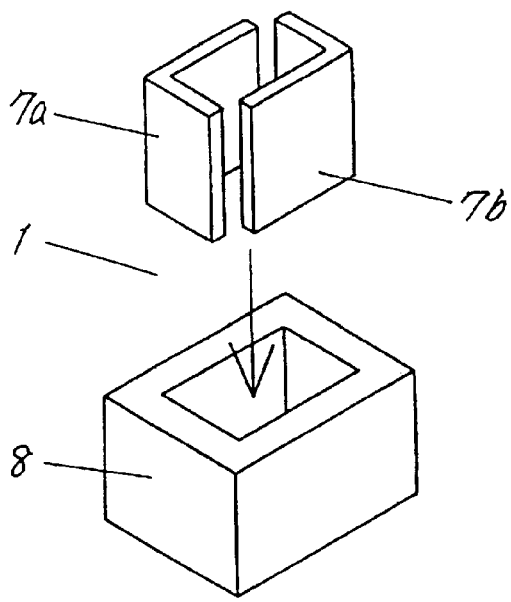
FIG. 3 is a perspective exploded view of a shell for composing the molding die for forming the optical fiber aligning array in the embodiment of the invention.

As shown in FIG. 3, the shell 1 has a guide pattern 8 as an outer shell, and a pair of split shells 7a, 7b as inner shells. The guide pattern 8 is formed of one die material not having junction, and the guide pattern 8 has a second penetration hole of a rectangular shape. The inner side of the second penetration hole is covered with a protective film, so that the molding material may not stick. The pair of split shells 7a, 7b have first split shell 7a and second split shell 7b having an L-shaped section. The first split shell 7a and second split shell 7b are combined mutually in the horizontal direction. The combined split shells 7a, 7b are inserted into the second penetration hole of the guide pattern 8. The combined pair of split shells 7a, 7b have a penetration hole for inserting the molding material, and have an inner circumference for forming the outer circumference of the V-groove array.

The lower pattern 2 is inserted and fixed at the lower end side of the shell 1. The lower pattern 2 has an inner side for forming the top side of the V-groove array. The upper pattern 3 is inserted from the upper end side of the shell 1, and is disposed slidably in the shell 1. The upper pattern 3 has an inner side for forming the bottom side of the V-groove array. That is, the inner side of the lower pattern 2 or upper pattern 3 has a concave and convex shape for forming the V-groove 6b of the molded product. The space surrounded by the lower pattern 2, upper pattern 3, and inner shells 7a, 7b forms a cavity to be filled with the molding material. The forming sides of the upper pattern and lower pattern forming the cavity are coated with a protective film so that the molding material may not stick thereto.

Such molding die 4 is used. In the cavity of the molding die 4, a glass vitreous material 5 is disposed as glass material. As the glass vitreous material 5 is being heated, the upper pattern 3 descends, and the glass vitreous material 5 is pressurized and molded. Then, the molded glass or die is cooled. Later, the molded product is taken out of the die. Thus, a glass molded product is obtained.

In this molding process, when the glass vitreous material 5 is heated and pressurized, the glass vitreous material 5 is softened or fused. In this state, the pressurizing force is transmitted to the inner shells 7a, 7b and outer shell 8 through the glass material. That is, the outer shell 8 has a strong mechanical structure to withstand the pressurizing force. When the outer shell 8 is formed of one die material having no junction, a strong die withstanding this pressurizing force is obtained.

Preferably, when taking out the molded product from the die, first, the upper pattern 3 is detached from the die 4. Next, the outer shell 8 is removed from the die 4. Then the first split shell 7a is separated from the second split die 7b. Finally, the molded product is separated from the split shells 7a, 7b. Thus, the molded product is taken out from the die.

In this constitution, by heating, pressurizing and molding the glass vitreous material 5, if the molded product sticks the inner side of the shell 1, the shell 1 can be disassembled into the first split shell 7a, second split shell 7b, and guide pattern 8. Thus, the molded product can be easily taken out without being damaged.

In particular, in the case of the rectangular molded product having step part 6a and V-groove 6b such as the V-groove array shown in FIG. 1, the molded product is likely to stick to the shell 1. That is, the glass vitreous material 5 must permeate deeply into narrow parts of the ridge and corner of the forming space (cavity) of the molding die 4. Accordingly, the die is filled with the glass vitreous material 5 corresponding to a volume slightly larger than the volume of the V-groove array after forming. Therefore, when the upper pattern 3 descends, and the glass vitreous material 5 is pressurized, an excessive glass vitreous material 5 gets into the abutting portions of the shell 1 and upper pattern 3, or the shell 1 and the lower pattern 2, thereby forming burrs. In the event of such phenomenon, the molded product in the die is likely to stick to the shell 1. If such burrs should occur, however, by using the die 4 of this exemplary embodiment, the molded product can be easily taken out of the die.

Meanwhile, the burrs on the molded product formed at the time of molding are thin and brittle. Therefore, when taking out the molded product from the pair of split shells 7a, 7b, all these burrs are broken and removed. Further, as the burrs are broken, a taper is formed in the burr removed area. Thus, extra step of removing burrs from the molded product is not needed. Further, it does not need another step of forming a taper.

Preferably, the pair of split shells 7a, 7b and guide pattern 8 are made of a hard material having a harder property than the molded product. For example, the hard material is cemented carbide such as tungsten carbide. Therefore, if a large pressure is caused by pressurizing and molding, breakage of the die is prevented. Further, the service life of the die is extended. Moreover, the tungsten carbide has a higher heat resisting temperature than iron, and hence a material having a higher fusing temperature can be formed.

Exemplary Embodiment 2

Figure 4:
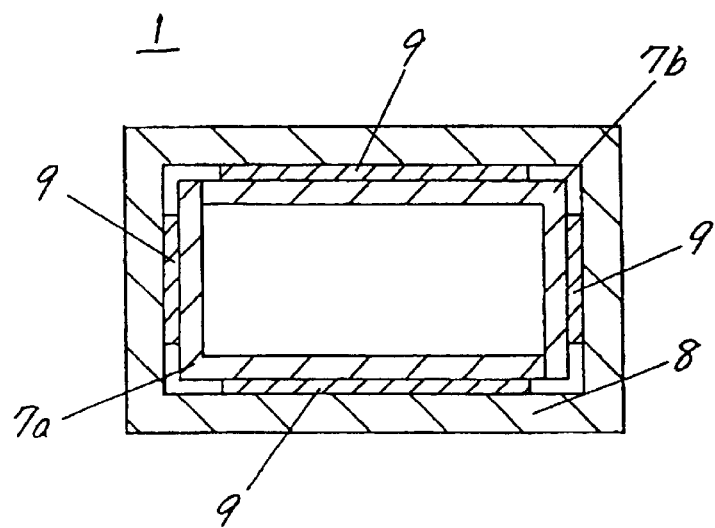
FIG. 4 is a top view of the shell shown in FIG. 3.
Figure 6:
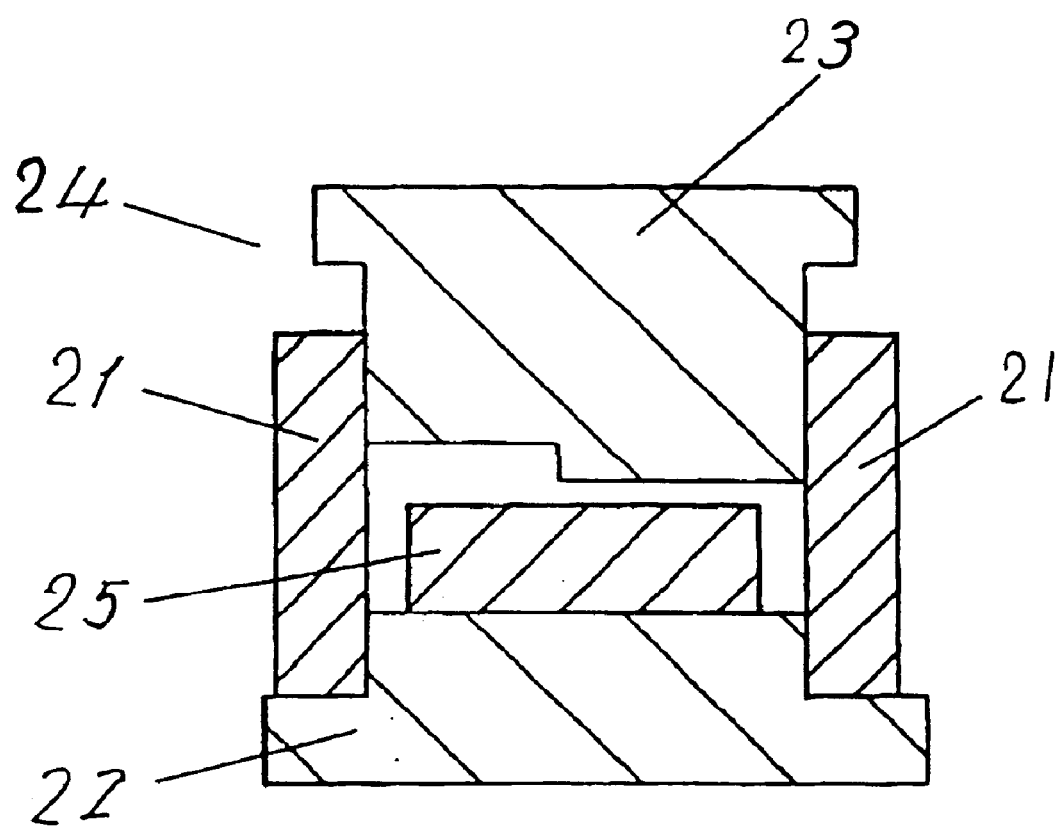
FIG. 6 is a sectional view of a conventional molding die.

FIG. 4 is a sectional view of a shell 1 in a molding die in other exemplary embodiment of the invention.

In FIG. 4, the shell 1 comprises a pair of split shells 7a, 7b as inner shell, a guide pattern 8 as outer shell, and a spacer 9. The spacer 9 is disposed between the split shells 7a, 7b, and the guide pattern 8. The other structure of the die in exemplary embodiment 2 is same as in the foregoing exemplary embodiment 1.

Preferably, the split shells 7a, 7b, and the guide pattern 8 are made of a hard material having a harder property than the molded product. Further preferably, the spacer 9 is made of a softer material than the split shells 7a, 7b. Still more, the spacer 9 has a larger coefficient of thermal expansion than the pair of split shells 7a, 7b.

In this constitution, the assembled shell 1 is integrated more firmly.

When the material for composing the split shells 7a, 7b and guide pattern 8 is cemented carbide such as tungsten carbide, a certain clearance must be formed between the guide pattern 8 and the split shells 7a, 7b in order to insert the split shells 7a, 7b into the guide pattern 8. By the presence of this clearance, the split shells 7a, 7b are loose in the guide pattern 8. To eliminate the looseness, a spacer 9 made of a softer stainless steel than the cemented carbide is interposed between the split shells 7a, 7b and the guide pattern 8, so that the shell 1 can be integrated more firmly.

Preferably, as the material for the split shells 7a, 7b and guide pattern 8, tungsten carbide or other cemented carbide is used. Further preferably, as the material for the spacer 9, stainless steel is used. In this case, the coefficient of thermal expansion of stainless steel for forming the spacer 9 is $150 \times 10^{-7}$, and that coefficient of thermal expansion of the cemented carbide for forming the split shells 7a, 7b and guide pattern 8 is $56 \times 10^{-7}$. That is, the spacer 9 has the coefficient of thermal expansion about three times higher than the split shells 7a, 7b and guide pattern 8.

Therefore, in this constitution in which the coefficient of thermal expansion of the spacer 9 is larger than the coefficient of thermal expansion of the split shells 7a, 7b and guide pattern 8, first at ordinary temperature, the split shells 7a, 7b and spacer 9 are inserted into the guide pattern 8. In this case, the thickness of the spacer 9 is slightly smaller than specified. As a result, the split shells 7a, 7b and spacer 9 have a slight clearance against the guide pattern 8. It is hence easier to assemble the split shells 7a, 7b and spacer 9 into the guide pattern 8. When the assembled die or the molding material in the die is heated, the spacer 9 expands between the split shells 7a, 7b and the guide pattern 8. Since the thermal expansion of the spacer 9 is greater than the thermal expansion of the split shells 7a, 7b and guide pattern 8, the clearance is reduced or the clearance is eliminated. Accordingly, at the time of molding, the assembled shell 1 is mutually integrated more firmly. As a result, the shape precision of the molded product is enhanced.

When the temperature in the die is lowered, the molded product is taken out of the die. At this time, the spacer 9 is shrunk thermally. Therefore, the shell can be easily disassembled. For example, the split shells 7a, 7b and molded product can be easily separated from the guide pattern 8. Later, the first split shell 7a is separated from the second split shell 7b, so that the molded product can be easily taken out. As a result, the removal job of the molded product from the die is much easier.

In exemplary embodiment 1 and exemplary embodiment 2, a pair of split shells comprising first split shell 7a and second split shell 7b are used as the split shells, but not limited to this structure, split shells having plural patterns can be used. For example, split shells may be divided into three patterns or four patterns.

Exemplary Embodiment 3

A manufacturing process of molded product in exemplary embodiment 3 of the invention is shown in FIG. 5.

In FIG. 5(a), an inner shell is assembled into an outer shell having a second penetration hole, and a shell having a penetration hole is set up. Herein, the inner shell has plural split shells, and the penetration hole is surrounded by plural split shells.

In (b), the shell is placed to a lower pattern so that the lower pattern is inserted and disposed in the lower opening of the penetration hole of the shell.

In (c), a molding material is placed in the cavity surrounded by the penetration hole and lower pattern.

In (d), an upper pattern is inserted into the cavity from the upper opening of the penetration hole of the shell, and the molding material is heated, pressurized, and molded.

In (e), ahter the pressurized and formed molded product is solidified, the upper pattern and outer shell are detached from the inner shell and lower pattern.

In (f), the plural split shells are divided, and the molded product is taken out from the region surrounded by the inner shell.

Thus, the molded product is manufactured.

Preferably, in this method, the lower pattern is fixed on the base of the molding machine. In this case, when step (e) is executed, the molded product surrounded by the lower pattern and inner shell is left over. In this state, at step (f), the plural split shells are divided, and then the molded product is taken out of the lower pattern.

In exemplary embodiment 3, the detail of each manufacturing step is same as explained in exemplary embodiment 1 and exemplary embodiment 2.

In exemplary embodiments 1, 2 and 3, the lower pattern 2 is inserted into the lower end of the shell 1, but not limited to this structure, the lower pattern 2 may be, for example, assembled around the shell 1.

In exemplary embodiments 1, 2 and 3, as the molding material, glass material is used, but not limited to this, ceramic material, inorganic material, plastic material, or their composite material may be used. In particular, when glass material is used as the molding material, the excellent effects are obtained.

In exemplary embodiments 1, 2 and 3, as the outer shell 8, a rectangular die having a penetration hole made from one die material not having junction is used, but not limited to this, an outer shell formed by combining plural spilt shells can be used. In this case, the plural split shells must be mutually joined firmly by means of a joining tool. However, as explained in the exemplary embodiments, the outer shell having a penetration hole is preferred, and particularly excellent effects are obtained.

Thus, according to the constitution of the invention, if the molded product sticks to the inner circumference of the shell, by disassembling the shell, the molded product can be easily taken out of the molding die. Further, the molded product having an excellent dimensional precision is manufactured. Moreover, the molded product having complicated convex and concave shape can be easily manufactured.

What is claimed is:

1. A molding die comprising:
   (a) a shell having a penetration hole, said penetration hole having a lower opening and an upper opening,
   (b) a lower pattern inserted and disposed in the lower opening of the shell, and
   (c) an upper pattern slidably disposed from the upper opening of the shell,
   wherein said shell includes an outer shell and an inner shell disposed inside of the outer shell,
   said inner shell is composed of a plurality of split shells joined together in a direction transverse to the penetration hole,
   the inner shell is separable from the outer shell, and
   said inner shell, lower pattern, and upper pattern form a cavity.

2. The molding die of claim 1,
   wherein said outer shell has a second penetration hole,
   said inner shell is disposed in the second penetration hole, and
   said inner shell is composed of two split shells having a first split shell and a second split shell.

3. The molding die of claim 2,
   wherein said inner shell is disposed detachably from the second penetration hole of the outer shell.

4. The molding die of claim 1,
   wherein said outer shell is formed of one die material not having a junction.

5. A molding die comprising:
   (a) a shell having a penetration hole, said penetration hole having a lower opening and an upper opening.
   (b) a lower pattern inserted and disposed in the lower opening of the shell, and
   (c) an upper pattern slidably disposed from the upper opening of the shell,
   wherein said shell includes an outer shell and an inner shell disposed inside of the outer shell,
   said inner shell is composed of plurality of split shells,
   the inner shell is separable from the outer shell, and
   said inner shell, lower pattern, and upper pattern form a cavity,
   wherein said shell further includes a spacer disposed between the outer shell and inner shell.

6. The molding die of claim 5,
   wherein said spacer has a larger coefficient of thermal expansion than the outer shell and inner shell.

7. The molding die of claim 6,
   wherein said inner shell has a nearly same coefficient of thermal expansion as the outer shell.

8. The molding die of claim 1,
   wherein said cavity is filled with at least one material selected from the group consisting of glass, ceramics, and inorganic materials.

9. A molding die comprising:
   (a) a shell having a penetration hole, said penetration hole having a lower opening and an upper opening
   (b) a lower pattern inserted and disposed in the lower opening of the shell, and
   (c) an upper pattern slidably disposed from the upper opening of the shell,
   wherein said shell includes an outer shell and an inner shell disposed inside of the outer shell,
   said inner shell is composed of a plurality of split shell,
   the inner shell is separable from the outer shell, and
   said inner shell, lower pattern, and upper pattern form a cavity,
   wherein said cavity has a shape for obtaining an optical fiber aligning array, and
   the optical fiber aligning array has plural V-grooves formed on the upper surface of a rectangular glass molded body.

10. A manufacturing method of molded product comprising the steps of:
    (a) combining an inner shell in an outer shell having a second penetration hole, and obtaining a shell having a penetration hole, said inner shell having plural split shells, and said penetration hole surrounded by the plural split shells joined together in a direction transverse to the penetration hole,
    (b) disposing a lower opening of the penetration hole of the shell to a lower pattern
    (c) placing a molding material in a cavity surrounded by the penetration hole and lower pattern,
    (d) forming a molded product by inserting an upper pattern into the cavity from an upper opening of the penetration hole of the shell, and pressurizing the molding material while heating the molding material,
    (e) separating the upper pattern and outer shell from the inner shell and lower pattern, after the molded product formed by pressurizing is solidified, and
    (f) taking out the molded product by separating the plural split shells after step (e).

11. The manufacturing method of molded product of claim 10,
    wherein said plural split shells are a pair of split shells composed of a first split shell and a second split shell, and
    said first split shell and second split shell are separatable in a direction transverse to the penetration hole.

12. The manufacturing method of molded product of claim 10, wherein said outer shell is formed of one die material not having a junction.

13. The manufacturing method of molded product of claim 10, wherein when the molding material is heated and pressurized at step (d), the molding material is softened, and the pressure is transmitted to the inner shell and outer shell through the softened molding material, so that the inner shell is fixed to the outer shell.

14. A manufacturing method of molded product comprising the steps of:

(a) combining an inner shell in an outer shell having a second penetration hole, and obtaining a shell having a penetration hole, said inner shell having plural split shells, and said penetration hole surrounded by the plural split shells, (b) disposing a lower opening of the penetration hole of the shell to a lower pattern (c) placing a molding material in a cavity surrounded by the penetration hole and lower pattern, (d) forming a molded product by inserting an upper pattern into the cavity from an upper opening of the penetration hole of the shell, and pressurizing the molding material while heating the molding material.

(e) separating the upper pattern and outer shell from the inner shell and lower pattern, after the molded product formed by pressurizing is solidified, and (f) taking out the molded product by separating the plural split shells after step (e)

wherein said shell further includes a spacer, and said step (a) includes a step of assembling the shell by interposing the spacer between the outer shell and inner shell.

15. The manufacturing method of molded product of claim 14, wherein said spacer has a larger coefficient of thermal expansion than the outer shell and inner shell.

* * * * *